United States Patent Office 3,156,660
Patented Nov. 10, 1964

3,156,660
EPOXY RESINOUS COMPOSITIONS AND
THEIR PREPARATION
James R. Scheibli, Oakland, Calif., assignor to Shell Oil
Company, a corporation of Delaware
No Drawing. Filed Oct. 16, 1959, Ser. No. 846,792
14 Claims. (Cl. 260—28)

This invention relates to new resinous compositions and their preparation. More particularly, the invention relates to new polyepoxide compositions containing special extending and flexibilizing materials, and to their use, particularly in the preparation of coating and sealing compositions.

Specifically, the invention provides new and particularly useful compositions comprising (1) a polyepoxide possessing more than one vic-epoxy group, and preferably a glycidyl polyether of a polyhydric phenol, (2) a bituminous material, such as, for example, straight run asphalt, and (3) an alkylated phenol, and preferably a long chain polyalkylated phenol such as dinonyl phenol. The invention further provides insoluble infusible products obtained by treating the above-described compositions with an epoxy curing agent, and particularly amines, acids, acid anhydrides and $BF_3$ complexes.

As a special embodiment, the invention further provides a method for utilizing the above-described compositions as binders for skid-resistant grit layers for roadways and walkways and as binders for construction of new roadways and walkways.

There is a growing need for a cheap surfacing composition that can be applied to cement, asphalt, metal and wood surfaces to protect them from destruction by wear and exposure to outdoor weather conditions. There is also a need for such a coating for cement and asphaltic roadways and walkways to reduce their tendency to skid when wet. In the case of the asphaltic surfaces, there is a further need for coatings which would improve resistance to solvents and heat. This is particularly urgent in the case of asphalt runways for jet aircraft as the jet fuels readily attack asphalt surfaces and the heat from the aircraft cause a softening of asphaltic surfaces.

Various coatings have been suggested for the above applications, but they have not proved very satisfactory. In many cases, the coatings fail to have the necessary adhesion to the cement, asphalt and metal surfaces. In other cases, the coatings lack flexibility and distensibility and are easily cracked. In other cases, the coatings fail to stand up under constant wear and exposure to outdoor weather conditions. In still other cases, the coatings fail to have the necessary solvent and heat resistance and lack skid resistant properties. In other cases, the coatings cure only at a slow rate and/or require special conditions for curing. In still other cases, the coatings are too expensive for use on large areas as roadways and walkways.

It is, therefore, and object of the invention to provide new and improved resinous compositions and a method for their preparation. It is a further object to provide new resinous compositions which are particularly useful as coatings for cement, asphalt and metal surfaces. It is a further object to provide new polyepoxide compositions which cure rapidly at low temperatures. It is a further object to provide compositions which form coatings having improved flexibility and distensibility. It is a further object to provide new coating compositions containing polyepoxides which have excellent resistance to wear and outdoor weather conditions. It is a further object to provide new coating compositions which have improved resistance to solvents and to heat. It is a further object to provide new resinous compositions which can be used to provide skid-resistance to cement, asphalt and metal surfaces. It is a further object to provide new polyepoxide coating compositions which have low viscosity and can be employed without the use of solvents. It is a further object to provide new coating compositions which contain large amounts of inexpensive extenders, such as asphalts, fuel oils and the like. Other objects and advantages of the invention will be apparent from the following detailed description thereof.

It has now been discovered that these and other objects may be accomplished by the compositions of the invention comprising a mixture of (1) a polyepoxide possessing more than one vic-epoxy group, and preferably a glycidyl polyether of a polyhydric phenol, (2) a bituminous material, and (3) an alkylated phenol, and preferably a long chain polyalkylated phenol, such as dinonyl phenol, the polyepoxide preferably being present in an amount of at least 10% by weight of the mixture. These liquid compositions have lower viscosities than similar systems without the alkylated phenol. When cured with epoxy curing agent, such as, for example, amines the compositions set up quickly even at low temperatures to form homogeneous insoluble, infusible products. The products are very hard and tough and have excellent adhesion to cement, asphalt and metal surfaces. In addition, coatings prepared therefrom have good resistance to wear and to outdoor weather conditions. As the coatings are infusible and insoluble they also have excellent resistance to heat, solvents and fuels. The coatings are particularly attractive in that they can be prepared at a low cost and can be easily applied in large areas without the use of solvents.

When small inert particles or aggregate are added to the compositions before or during cure, the compositions can be used as skid-resistant coatings or in the preparation of overlays or roadbeds for new construction of roads, runways and walkways. The compositions are particularly attractive for these uses as they can be easily applied to large areas and set up quickly without the use of any special curing conditions.

The fact that the compositions contain large amounts of the bituminous materials and still cure rapidly to hard tough coatings was quite unexpected in view of the fact that epoxy-resin bituminous mixtures heretofore gave soft heterogeneous products. The alkylated phenols appear, as part of their function in the composition, to act as an unexpected compatibilizing agent permitting the composition to retain large amounts of the bituminous material without affecting the cure and homogeneity of the resulting product.

Further, it was unexpected to find that the coatings had good flexibility and heat resistance as it is known that bituminous materials generally form brittle coatings which soften on heating. The polyepoxides also form relatively brittle coatings in comparison with those of the compositions described.

The polyepoxides to be used in preparing the compositions of the invention comprise those materials possessing more than one vicinal epoxy group, i.e., more than one

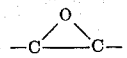

group. Those compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples includes the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tertarate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexadecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.) polyglycidyl ether of 1,1,5,5-tetrakis(hydroxyphenyl) pentane (epoxy value 0.514 eq./100 g.) and the like and mixtures thereof.

The bituminous materials used in the compositions of the present invention include substances containing bitumens or pyrobitumens, pyrogenous distillates and tar, pyrogenous waxes and pyrogenous residues (pitches and pyrogenous asphalts). They are preferably composed mainly of hydrocarbons although they may contain amounts of sulfur, nitrogen and oxygen-containing materials. They also are preferably fusible and largely soluble in carbon disulfide. Examples of such bituminous materials may be found in Abraham's "Asphalts and Allied Substances," vol. I, page 57, 5th edition.

An especially preferred group of bituminous materials to be used in the compositions of the invention include the asphalts. These asphalts may be naturally occurring asphaltic material, such as Gilsonite or petroleum derived, such as straight run, blown, cracked and catalytically or non-catalytically polymerized asphalts. All such asphalts are useful regardless of their original penetrations or softening points.

Especially preferred are the straight run asphalts used for paving, such as those having penetrations between 40 and 300 and softening points within the range from about 145° F. to about 95° F. Blown asphalts are normally produced in the presence or absence of catalysts by blowing asphalts or fluxes at elevated temperatures with an oxygen-containing gas such as air. Typical blown asphalt may have softening point range of between about 300° F. and about 120° F. and a penetration within the range from about 100 to about 0.

Aromatic asphalts, such as those comprising the bottoms products from the distillation of catalytically cracked gas oil, are also preferred.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta, beta-dichloroethyl ether, nitrobenzene and the like. The use of the so-called double solvent process employing mutually immiscible solvents like cresylic acid and propane also gives suitable extracts. Especially preferred are the Edeleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity between 10 cs. at 100° F. to about 1500 cs. at 100° F.

Also preferred are the products derived from coal such as coal tars, refined coal tars and coal tar pitches, and preferably those having a softening point below 190° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is termed "coal tar pitch." Residuals having a fusing point below about 90° F. are referred to herein as refined coal tars while those having fusing points of 90° F. or above are coal tar pitches. As used herein, in reference to coal tar products, "softening point" or "fusing point" refers to values obtained by the cube method as described in vol. II, Abraham, "Asphalts and Allied Substances," 5th Edition. The coal products should possess at least 50% and preferably 75% solubility in carbon disulfide. The coal tar, refined coal tar and coal tar pitch may be acidic, basic or neutral, depending on whether the acid and/or basis have been removed. These coal products may be obtained from various types of bituminous coals, such as, for example, camel, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° F. and a solubility in carbon disulfide of at least 75% with a specific gravity of 1.10 and 1.50, and low melting coal tar pitches having a fusing point below 120° F. and a solubility in carbon disulfide of at least 75%.

The other component to be used in producing the compositions of the invention comprises the alkylated phenols. These phenols may be monohydric or polyhydric and are substituted with at least one and preferably two or more hydrocarbon side chains which are preferably long alkyl side chains. The position of the side chain or chains on the aromatic ring is not important, but is preferably in the meta and para positions relative to the OH group. Examples of the alkylated phenols include, among others, dinonyl phenol, dioctyl phenol, didodecyl phenol, ditetradecyl phenol, dioctadecyl phenol, trinonyl phenyl, nonyl phenol, octyl phenol, nonyl cresol, heptyl phenol, diheptyl phenol, pentadecyl phenol, heptyl dodecyl phenol, heptyl ditetradecyl phenol, eicosanyl phenol, dinonyl resorcinol, dioctyl resorcinol, 2,2-bis(4-hydroxy-3-nonylphenyl)propane, 2,2-bis(4-hydroxy-3,5-dioctylphenyl)propane, di-(hydroxynonylphenyl)methane, 2,2-bis(4-hydroxy-2-decylphenyl)butane, dioctenyl phenol, tritetradecyl phenol and the like.

Preferred alkylated phenols to be employed include those possessing at least 7 carbon atoms in the side chain, and especially the di-tri- and tetraalkyl substituted monohydric phenols and dihydric phenol wherein at least two of the alkyl side chains contain from 8 to 24 carbon atoms.

Coming under special consideration, particularly because of their low cost and superior properties obtained therewith are the crudes obtained by the alkylation of phenols with long chain hydrocarbons to obtain derivatives for detergent purposes. Such crudes normally contain large amounts of the dialkylated phenols along with portions of the monoalkylated and possibly trialkylated or higher alkylated products. Crude dinonyl phenol which has been found to be particularly useful, for example, contains large amounts of dinonyl phenol along with mononyl phenol.

The compositions of the present invention may be prepared by any suitable method. The compositions may be prepared, for example, by simply mixing the three components together in any order with or without the application of heat. As the compositions prepared from the liquid polyepoxides are fluid products of low viscosities, mere mixing the component is sufficient. However, if one or more of the components is a very thick liquid or solid, it is desirable to heat them before or during mixing. Various solvents or diluents which will evaporate before or during cure may also be added to assist in the preparation of the mixtures. Suitable solvents include, among others, hydrocarbons such as xylene, benzene and the like. It is also convenient to sometimes use liquid polyepoxides, such as normally liquid glycidyl polyethers of polyhydric alcohols, or to utilize monoglycidyl derivatives such as butaglycidyl ether, phenol glycidyl ether and the like.

The ratio of the three components to be utilized in the above compositions may vary within certain limits. The amount of the polyepoxides should be at least 10% by weight of the combined mixture and preferably from 10% to 70% by weight of the mixture. The alkylated phenols should make up at least 3% by weight of the combined mixture and preferably no more than 85% by weight of the mixture. Particularly superior results are obtained when the polyepoxide makes up from 10 to 60% of the combined mixture, the alkylated phenol makes up from 5% to 50% and the bituminous material makes up from 30% to 65% by weight of the combined mixture.

As noted above, the compositions of the invention may also be used as binders for grit layers for the coating of already prepared concrete and metal surfaces and as binders for aggregate in the preparation of new roadways and walkways. In the case of the grit layers, the compositions are combined with a relatively large proportion of inert particles which are preferably finely divided and have a mesh size varying from about 50 to 500. Preferred materials include sand, crushed rock, finely divided shells, crushed quartz, aluminum oxide, finely divided resinous particles and the like. Preferred materials to be employed are the minerals and especially the siliceous materials, such as, for example, sand and ground rock. Mixtures of various types of particles may also be employed.

When being used as a binder for aggregate for the preparation of new roadways, the above compositions are mixed with various types of aggregate, such as ground rock and the like which have a larger size then the aforedescribed grit particles. These materials preferably have a mesh size varying from about 0 to 50.

The amount of the inert particles and aggregate employed preferably comprise at least 50% by weight of the binder composition and still more preferably makes up from 75% to 250% by weight of the binder composition.

In making the grit layers and the roadway compositions, the particles and aggregate may be added at any time during the preparation of or after the preparation of the above-described compositions. It is also possible to apply the composition as a coating and then sprinkle the particles on the top of the coating and then compact by means of rollers and the like.

When used as coatings, the compositions of the invention may be applied to any surface, but are particularly suitable for use as surfacing compositions for cement, asphalt, wood, and steel. The cement may be any of the usual types such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface can be accomplished in any suitable manner. If material is thick or contains large amounts of inert particles, the material may best be applied by use of a screed, trowel, shovel or broom. If it is of a more fluid nature, it may be applied by brushing or spraying. The coatings will generally vary in thickness from about 1/16 inch to about 1/2 inch.

A great variety of substances are now known to be hardening agents for the resin-forming ingredients of the composition such as alkalies like sodium or potassium hydroxide; alkali phenoxides like sodium phenoxides; carboxylic acids or anhydrides such as oxalic acid or phthalic anhydride; Friedel-Crafts metal halides like aluminum chloride, zinc chloride, ferric chloride, or boron trifluoride, as well as complexes thereof with ethers, acid anhydride, ketones, diazonium salts, etc.; phosphoric acid and partial esters thereof including n-butyl ortho-phosphate, diethyl ortho-phosphate and hexaethyl tetraphosphate; and amino compounds such as triethylamine, ethylene diamine, diethylamine, diethylene triamine, tri-ethylene tetramine, pyridine, piperidine, N,N'-diethyl-1,3-propane-diamine, dicyandiamide, melamine, fatty acid salts of amines, and the like. The curing agent is added and mixed in with the composition after its preparation as noted above. The amounts vary considerably depending upon the particular agent employed. For the alkalies or phenoxides, 1% to 4% is generally suitable. With phosphoric acid and esters thereof, good results are obtained with 1 to 10% added. The amino compounds are preferably used in amounts of about 5 to 15% and the others involve addition of about 1 to 45% by weight.

When used with aggregate for the construction of roads, the compositions are preferably laid down in layers of about 1 inch to 6 inch thicknesses. Conventional paving equipment may be used in this application.

The compositions are also useful as coatings for pipes, offshore drilling rigs and the like.

The compositions may also be used to make pottings and castings, gasket sealing compositions, roofing compositions and in lamination of paper and the like.

The following examples illustrate the present invention. Unless otherwise specified, parts disclosed in the examples are parts by weight. Polyether resins described in the examples by letters are those described in U.S. 2,633,458. The concrete used in the example was prepared from hydraulic cement (Portland cement), aggregate, sand and water. Parts described in the examples are parts by weight unless otherwise indicated.

*Example I*

This example illustrates the preparation and some of the properties of a composition containing Polyether A, dinonyl phenol and paving grade asphalt.

20% by weight of Polyether A, 40% by weight of dinonyl phenol and 40% straight run asphalt were combined with stirring. 13 parts per 100 parts of Polyether A of diethylene triamine was then added to the mixture. This mixture was stirred and spread between two glass plates and allowed to cure at room temperature over night. The self-support film that was removed was strong, tough flexible and had good resistance to jet fuels. The product had a tensile strength of 782 p.s.i. and an elongation of 50%.

A composition was prepared as above and spread out as a thin film on cement concrete surfaces and the film allowed to cure at room temperature. The resulting coating showed good adhesion to the cement and had excellent hardness and resistance to jet fuels.

A further composition was prepared as above and spread out as thin film on cement concrete surfaces. 100% by weight of sand was sprinkled on the composition and compacted by rolling. This combination was then allowed to set at atmospheric temperature. The resulting coating was a very hard tough skid resistant coating. The coating also demonstrated good resistance to jet fuels.

*Example II*

Example I was repeated with the exception that the ratios of components were changed as follows:

| Polyether A, percent | Asphalt, percent | Dinonyl Phenol, percent |
|---|---|---|
| 50 | 16.7 | 33.3 |
| 50 | 25 | 25 |
| 50 | 33.3 | 16.7 |
| 50 | 10 | 40 |

Related results are obtained in each case.

*Example III*

Example I was repeated with the exception that the ratios of components were changed as follows:

| Polyether A, percent | Asphalt, percent | Dinonyl Phenol, percent |
|---|---|---|
| 20 | 16 | 64 |
| 20 | 26.7 | 53.3 |
| 20 | 53.3 | 26.7 |

Related results are obtained in each case.

*Example IV*

This example illustrates the preparation and some of the properties of a composition containing Polyether A, dinonyl phenol and industrial fuel oil (Bunker C).

20% by weight of Polyether A, 26.7% dinonyl phenol and 53.3% by weight of fuel oil were combined together with stirring. 13 parts per 100 parts of Polyether A of diethylene triamine were then added to the mixture. This mixture was stirred and spread between two glass plates and allowed to cure at room temperature. The self-supporting film that was removed was strong, tough and flexible and had good heat resistance and good resistance to jet fuels. The product possessed a tensile strength of 529 p.s.i. and elongation of 25%.

*Example V*

Example IV was repeated with the exception that the proportions were as follows:

| Polyether A, percent | Fuel Oil, percent | Dinonyl Phenol, percent |
|---|---|---|
| 20 | 26.7 | 53.3 |
| 20 | 40 | 40 |
| 20 | 16 | 64 |

Related results are obtained.

*Example VI*

Example IV was repeated with the exception the components are combined in a ratio of 50 parts Polyether A, 50 parts Bunker C fuel oil and 20 parts dinonyl phenol. Related results were obtained.

*Example VII*

This example illustrates the preparation and some of the properties of a composition containing Polyether A, an Edeleanu petroleum extract (Dutrex 20) and dinonyl phenol. Dutrex 20 has the following properties: Gravity, ° API, 5.8; flash, COC. 415° F.; viscosity, SSU, at 210° F., 9611; aniline point, 81° F.; acid No. 0.05; and iodine number 69.

20% by weight of Polyether A, 26.7% dinonyl phenol and 53.3% by weight of Dutrex were combined with stirring. 13 parts per 100 parts of Polyether A of diethylene triamine were then added to the mixture. This mixture was stirred and spread between two glass panels and allowed to cure at room temperature. The self-supporting film that was removed was strong, tough and flexible and had good heat resistance and resistance to jet fuels. The product possessed a tensile strength of 448 p.s.i. and elongation of 35%.

Example VIII

Example VII was repeated with the exception that the proportions were as follows:

| Polyether A, percent | Dutrex 20, percent | Dinonyl Phenol, percent |
|---|---|---|
| 20 | 26.7 | 53.3 |
| 20 | 40 | 40 |
| 20 | 16 | 64 |

Related results are obtained.

Example IX

This example illustrates the preparation and some of the properties of a composition containing Polyether A, didodecyl phenol and straight run asphalt.

20% by weight of Polyether A, 53.3% didodecyl phenol and 26.7% straight run asphalt were combined with stirring. 13 parts per 100 parts of Polyether A of diethylene triamine were then added to the mixture. This mixture was stirred and spread between two glass panels and allowed to cure at room temperature. The self-supporting film that was removed was strong, tough and flexible and had good solvent and heat resistance. The product had a tensile strength of 585 p.s.i. and elongation of 45%.

A composition was prepared as above and spread out as a thin film on cement surfaces. The film was allowed to cure at atmospheric temperature. The resulting coating showed good adhesion to the cement and had excellent hardness and resistance to jet fuels.

A further composition was prepared as above and spread out as thin film on cement concrete surfaces. 100% by weight of sand was sprinkled on the composition and compacted by rolling. This combination was then allowed to cure at atmospheric temperature. The resulting coating was a very hard tough skid-resistant coating. The coating also demonstrated good resistance to jet fuels.

Example X

Example IX was repeated with the exception that the components were combined in the following proportions:

| Polyether A, percent | Asphalt, percent | Didodecyl Phenol, percent |
|---|---|---|
| 20 | 16 | 64 |
| 20 | 40 | 40 |
| 20 | 53.3 | 26.7 |

Related results are obtained.

Example XI

This example illustrates the preparation and some of the properties of a composition containing Polyether A, nonyl phenol and straight run asphalt.

20% Polyether A, 26.7% nonyl phenol and 53.3% straight run asphalt were combined with stirring. 13 parts per 100 parts of Polyether A of diethylene triamine were then added to the mixture. This mixture was stirred and spread between two glass panels and allowed to cure at room temperature. The self-supporting film that was removed had good strength and flexibility and had good resistance to solvent and heat. The product had a tensile strength of 636 p.s.i. and elongation of 30%.

A composition prepared as above was also spread on concrete and cured at atmospheric temperature. The resulting coating was very hard and tough and had good adhesion to the cement.

Example XII

Example XI was repeated with the exception that the components were used in the following proportions:

| Polyether A, percent | Asphalt, percent | Nonyl Phenol, percent |
|---|---|---|
| 20 | 26.7 | 53.3 |
| 20 | 40 | 40 |

Related results were obtained.

Example XIII

Examples I, IV, IX and XI were repeated with the exception that the Polyether A was replaced with a mixture of 25 parts of diglycidyl and triglycidyl ester of dimer and trimer acid and 75 parts of Polyether A. Related results are obtained.

Example XIV

Examples I, IV, VIII and X were repeated with the exception that the Polyether A was replaced with Polyether B and a mixture of Polyether D and Polyether A.

Example XV

50% by weight of Polyether A, 40% by weight of dioctyl phenol and 10% straight run asphalt were combined with stirring. 13 parts per 100 parts of Polyether A of diethylene triamine were then added to the mixture. This mixture was stirred and spread between two glass panels and allowed to cure at room temperature. The resulting film had good strength and flexibility and showed good resistance to jet fuels.

A composition was prepared as above and spread out as a thin film on cement concrete surfaces. This combination was then allowed to cure at atmospheric temperature. The resulting coating showed good adhesion to the cement, excellent hardness and solvent resistance.

Example XVI

This example illustrates the preparation and some of the properties of a composition containing an epoxy-containing adduct of Polyether A and dimerized linoleic acid, dinonyl phenol and industrial fuel oil.

72.8% by weight of an adduct obtained by reacting 305 parts of Polyether A with 245 parts of dimer acid and 450 parts of straight run asphalt were combined with 20% by weight of dinonyl phenol and 7.2% by weight of industrial fuel oil and the mixture stirred. 3.5% by weight (based on the weight of the adduct) of diethylene triamine was then added to the mixture. The mixture was stirred and spread between two glass panels and allowed to cure at room temperature. The self-supporting film that was removed was strong, tough and flexible and had good resistance to jet fuels.

A composition was prepared as above and spread out as a thin film on cement concrete surface. The film was allowed to cure at atmospheric temperature. The resulting coating had good adhesion to the cement and was very hard and had good resistance to jet fuels.

Example XVII

A composition was prepared having the following composition:

| | Percent |
|---|---|
| Polyether A | 13.1 |
| Diglycidyl ester of dimerized linoleic acid | 25.8 |
| Dinonyl phenol | 12.0 |
| Asphalt | 46.0 |
| Diethylene triamine | 3.2 |

This composition was spread out between glass panels and allowed to cure at room temperature. The resulting self-supporting film was very tough and hard and had good resistance to jet fuels. The product had a tensile strength of 935 and an elongation of 47.

Example XVIII

Examples I, IV, IX, XI and XVI are repeated with the exception that the bituminous material is replaced by each of the following: coal tar pitch, refined coal tar, coal tar and middle oil. Hard tough films are obtained.

Example XIX

Examples I, IV, IX, XI, XVI and XVIII are repeated with the exception that the curing agent was as follows: 1,4-diaminocyclohexane and N-aminoethylpiperazine. Related results are obtained.

The above examples are also repeated using hexahydraphthalic anhydride and meta-phenylene diamine as the curing agents and heating to 150° C. Related results are also obtained.

Example XX

A coating composition was prepared using the following formulation:

| | Parts |
|---|---|
| Asbestine 3X (asbestos) | 245.6 |
| Cab-O-Sil (silica) | 10.1 |
| Polyether A | 275.1 |
| Bunker C industrial fuel oil | 229.1 |
| Dinonyl phenol | 91.6 |
| Xylene | 63.7 |
| Secondary butanol | 63.7 |

To this mixture was added 28.8 parts of diethylene triamine. The resulting composition had a total non-volatile content of 88% and a Brookfield viscosity (No. 4 Spindle) 6 r.p.m.—13,000 cps. 12 r.p.m.—7,200 cps.

The above composition was sprayed on metal panels using a DeVilbiss MBC gun at 60 p.s.i. The resulting coatings were allowed to cure at room temperature. The resulting coating had the following properties:

| | |
|---|---|
| 100° F. distilled water | Unaffected. |
| 20% sodium chloride | Do. |
| JP-4 jet fuel | Do. |
| 5% sulfuric acid | Do. |
| 50% sulfuric acid | Do. |
| Boiling 20% sodium hydroxide | Do. |
| 15% nitric acid | Do. |
| 10% hydrochloric acid | Do. |

The composition also showed excellent adhesion to cement and asphalt and formed skid-resistant coatings when combined with sand as noted in the previous examples.

Good coating compositions can also be obtained by combining polyepoxides with bituminous materials, such as fuel oils as Bunker C fuel oil which is a highly aromatic petroleum residue, and pine oil.

I claim as my invention:

1. A composition which when heated with an epoxy curing agent is converted to an insoluble infusible product consisting essentially of a mixture of (1) from 10% to 70% by weight of a polyepoxide having more than one vic-epoxy group, (2) from 3% to 85% by weight of an alkyl substituted phenol, and (3) from about 10% to about 65% by weight of a bituminous material.

2. A composition which when heated with an epoxy curing agent is converted to an insoluble infusible product consisting essentially of a mixture of (1) 10% to 70% by weight of a polyepoxide having more than one vic-epoxy group, (2) from 3% to 85% by weight of a polyalkylated phenol wherein at least one of the alkyl groups contains at least 7 carbon atoms, and (3) from about 10% to about 65% by weight of a petroleum derived bituminous material.

3. A composition as in claim 2 wherein the polyepoxide is a glycidyl polyether of a polyhydric phenol having a molecular weight between 250 and 900.

4. A composition as in claim 2 wherein the bituminous material is an asphalt.

5. A composition as in claim 2 wherein the bituminous material is a residual fuel oil having a viscosity between 10 cs. at 100° F. and 1500 cs. at 100° F.

6. A composition as in claim 2 wherein the bituminous material is an Edeleanu extract of petroleum distillates.

7. A composition as in claim 2 wherein the alkylated phenol is dinonyl phenol.

8. A composition as in claim 2 wherein the alkylated phenol is didodecyl phenol.

9. A composition which when heated with an epoxy curing agent is converted to an insoluble infusible skid-resistant coating consisting essentially of a mixture of (1) from about 10% to about 70% by weight of a polyepoxide possessing more than one vic-epoxy group, (2) from about 3% to 85% by weight by a polyalkylated phenol wherein at least one of the alkyl groups contains at least 7 carbon atoms, (3) from about 10% to about 65% by weight of an asphalt, the sum of the amounts of components defined in (1), (2) and (3) totaling 100% and (4) from 50% to 250% by weight of the combined weight of components defined in (1), (2) and (3) of small inert particles.

10. A composition which when heated with an epoxy curing agent is converted to an insoluble infusible product consisting essentially of (1) 20% to 50% by weight of a glycidyl polyether of a polyhydric phenol, (2) 5% to 25% by weight of a polyalkylated phenol, and (3) 25% to 75% by weight of an asphalt.

11. A composition which when heated is converted to an insoluble infusible product consisting essentially of (1) 20% to 50% by weight of a glycidyl polyether of a polyhydric phenol, (2) 5% to 25% by weight of dinonyl phenol, (3) 25% to 75% by weight of a petroleum derived bituminous material, and from about 1% to 45% by weight of the glycidyl ether of an epoxy curing agent.

12. A process for preparing an insoluble infusible flexible resinous composition consisting essentially of mixing and reacting (1) at least 10% by weight of materials (1), (2) and (3) of a polyepoxide having more than one vic-epoxy group, (2) at least 5% by weight of materials (1), (2) and (3) of an alkylated phenol, and (3) a bituminous material, and from 1% to 45% by weight of the polyepoxide of of an epoxy curing agent.

13. A process for coating surfaces to improve their wear, solvent resistance and skid resistance which comprises applying to the surface a layer of a mixture consisting essentially of (1) about 10% to 70% by weight of a polyepoxide having more than one vic-epoxy group, (2) from about 3% to 85% by weight of a polyalkylated phenol wherein one of the alkyl groups contains from 8 to 24 carbon atoms, and (3) from about 10% to 65% by weight of a bituminous material.

14. A composition consisting essentially of a mixture of (1) from 10% to 70% by weight of a polyepoxide having more than one vic-epoxy group, (2) from 3% to 85% by weight of a polyalkylated phenol wherein at least one of the alkyl groups contains at least 7 carbon atoms, (3) from about 10% to 65% by weight of a bituminous material of the group consisting of asphalts, high boiling extracts of petroleum distillates, residual fuel oils having a viscosity between 10 cs. at 100° F. and 1500 cs. at 100° F., coal tars, refined coal tars and coal tar pitches, and (4) from about 1% to 45% by weight of the polyepoxide of an epoxy resin curing agent.

References Cited in the file of this patent

UNITED STATES PATENTS

| | | |
|---|---|---|
| 2,765,228 | Whittier et al. | Oct. 2, 1956 |
| 2,906,720 | Simpson | Sept. 29, 1959 |
| 2,928,795 | Tinsley | Mar. 15, 1960 |

OTHER REFERENCES

Abraham: "Asphalt and Allied Substances," Fifth Edition, vol. 1, published by Van Nostrand Co., Inc., Princeton, New Jersey, 1945, pages 66 and 67.